United States Patent Office 3,367,871
Patented Feb. 6, 1968

3,367,871
MOLDED PRECISION-DIMENSIONED HIGH TEMPERATURE INSULATION MATERIAL
Arthur P. Mueller and Beverly Asher, Cincinnati, Ohio, assignors to The Philip Carey Manufacturing Company, Cincinnati, Ohio, a corporation of Ohio
No Drawing. Continuation-in-part of application Ser. No. 435,030, Feb. 24, 1965. This application July 25, 1966, Ser. No. 567,362
15 Claims. (Cl. 252—62)

ABSTRACT OF THE DISCLOSURE

A molded precision-dimensioned insulation material capable of continuous service at temperatures up to 2000° F. The material is composed of a major proportion of pre-calcined diatomite powder and a minor proportion of finely divided expanded perlite with a small amount of reinforcing asbestos fiber and with a primary binder of montmorillonitic clay and a low- and stable-viscosity modified starch as a secondary binder. A process for preparing a water dispersed binder solution for spray application to a dry mixture of thermal insulation materials. A water dispersion of montmorillonitic clay with small amounts of a dispersing agent and a magnesium sulfate is prepared separately. A water dispersion of the modified starch is prepared separately. The clay dispersion is added to the starch dispersion and mixed. A small amount of sodium methyl siliconate is added and mixed into the combined dispersion. A water dispersion of potassium pyroantimoniate is separately prepared and added to the mixed starch-clay dispersion just prior to application by spraying.

This invention relates to a molded thermal insulation material composed predominantly of diatomaceous earth, and which is suitable for continuous service at surface temperatures as high as 2000° F. This application is a continuation-in-part of copending application Ser. No. 435,030, filed Feb. 24, 1965, and now abandoned. The objects and special advantages of the product of this invention are set forth in detail hereinbelow.

Diatomaceous earth consists of the fossil, siliceous skeletons of microscopic plants (Diatomaceae), of both marine and fresh water origin, which occur in thousands of varieties as to shape and size. Characteristically, these minute siliceous skeletons are cellular and porous, so that they form a bulky mass which inherently has thermal insulation capabiilty and, due to their siliceous composition, also has substantial heat resistance. The silica in diatomaceous earth is in a hydrated amorphous form and the mineral usually contains about 5 percent of combined water. The silica content of diatomaceous earth usually ranges from about 80 to 90 percent. Small amounts of other minerals are often present as impurities in the deposit, including alumina (as clay), carbonates of lime and magnesia and oxide or carbonate of iron.

Diatomaceous earth, referred to hereinafter by its mineralogical name, diatomite, has long been used as an ingredient of various thermal insulating compositions, but the products have had serious deficiencies and limitations which the present invention has successfully overcome. One of the earliest expedients was simply to saw blocks or bricks of diatomite from the solid natural deposit; this product had a density of about 30 lb. per cubic foot, was fragile, subject to splitting and cracking in service, exhibited excessive shrinkage when heated, and was not serviceable above about 1500° F.

Large deposits of high grade diatomite are found in California, Oregon and Washington, and the mineral is produced commercially in large quantities for use as thermal insulation, as filtration aids, concrete additive, filler, fine abrasive and for many other uses. Deposits are also found in Algeria, Germany, Ireland, France, Australia and other countries, but the United States is the largest producer of this mineral.

Insulating bricks have been produced by press molding a moistened mixture of powdered and granulated diatomite, including added clay binder, sometimes with additions of a heat-decomposible organic aggregate such as granulated cork or fine sawdust, followed by firing in a kiln at temperatures up to 2500° F. These bricks have a density in the range of 30 to 60 lb. per cubic foot; they are much weaker than ordinary firebrick, but are considerably more efficient as thermal insulation. Their thermal conductivities usually range from about 1.5 to 2.0 B.t.u. per hour per square foot per degree F. per inch thickness at a mean temperature of 750° F.

Another type of molded thermal insulation produced from diatomite involves a chemical reaction between the silica of the diatoms and hydrated lime in the presence of water, in an autoclave under 125 lb. steam pressure, to form a hydrated calcium silicate binder for the diatomite particles. This was disclosed by Belknap in U.S. Patent 1,045,933 (1912). Hydraulic setting of the composition occurred under these conditions, but a large proportion of the diatomite was chemically and physically altered by the reaction. Since the calcium silicate binder formed has relatively low heat resistance and begins to decompose at about 900° F., this product is not serviceable at temperatures above about 1400° F., due to excessive shrinkage and cracking. Various modifications of the lime-silica reaction process, applied to the production of diatomite molded insulations, have been proposed, such as the Teitsworth patents, U.S. 1,520,893 (1924) and 1,590,132 (1926). These were not successful in raising the srevice temperature of the molded diatomite insulation above about 1500° F., even using calcined diatomite in the composition, due to failure of the binder.

Where continuous exposure to high temperatures was required, and high thermal insulation efficiency also was desirable or essential, the most satisfactory and generally acceptable diatomite insulation product, prior to the present invention, has been a block molded from calcined diatomite with a minor proportion of binder such as bentonite or other highly plastic clay, reinforced with long asbestos fiber. This product is formed by filter-molding from a slurry of the solid ingredients in water, the piece is molded in an over-size mold to allow for drying shrinkage, the piece is removed from the mold and placed on a rigid support to prevent deformation during drying, is then dried at a temperature below about 500° F., and the dried piece is then sawed or machined to the desired finished dimensions. This is a cumbersome and wasteful process, nevertheless it has been in general use for many years.

This type of diatomite insulation has a density in the range of about 22 to 28 lb. per cubic foot, is sufficiently strong for handling and installation and is serviceable on surfaces at temperatures above 1500° F. and up to about 1900° F. At temperatures above 1900° F. it is unsatisfactory due to excessive heat shrinkage, thus it does not meet the requirements of Specification MIL–I–2819D, Class 4 in respect to maximum linear shrinkage of 3.0 percent in the 6 hour soaking heat test at 2000° F. This type of diatomite thermal insulation usually has a thermal conductivity in the range of 0.75 to 0.95 B.t.u. per hour per square foot per degree F. per inch at a mean temperature of 750° F. The moisture resistance of this type of insulation is low, both as to effects of humid exposure on its strength, and the absorption of liquid water by the insulation on contact with its surface.

The major object of this invention is to provide a monolithic molded diatomite thermal insulation having high insulation efficiency and that is capable of continuous service on surfaces at temperatures up to 2000° F. without appreciable cracking, shrinkage or other serious deterioration of its structural integrity.

Another important object of this invention is to produce the new diatomite high temperature insulation by a simple, direct molding process that does not involve filtration of water from the mold nor molding the piece to over-size dimensions.

A particularly advantageous feature of this invention is that the high temperature resistance of the molded insulation product is afforded by the new diatomite composition and method of manufacture, without requiring any high temperature kiln firing of the molded piece to produce a vitreous bond of the siliceous diatoms. Thus the molded piece is merely dried at a relatively low temperature to remove the excess water and is then ready for use.

Another important object is to provide a diatomite molded insulation composition which is characterized by extremely high dimensional stability such that the drying shrinkage of the moist, freshly-molded piece is negligible and, further, that the heat shrinkage of the dried molded piece is very low in service up to 2000° F. Thus, the insulation is molded to the exact finished size desired and, after drying, requires no machining, sawing or other finishing operation to bring it to specified dimensions.

Another object of this invention is to provide a molded diatomite thermal insulation having much lower density and higher thermal insulation efficiency than kiln-fired diatomite brick and other so-called refractory insulations, but possessing high flexural and compressive strengths and good resistance to mechanical stresses and abrasion that render it fully adequate for service under severe conditions.

It is also an object of this invention to provide a molded diatomite thermal insulation that has relatively low water absorption and that does not exhibit excessive loss of strength when exposed to high humidity.

Another advantageous feature of this invention is that the composite binder used to integrate the diatomite particles into a hard, strong, non-shrinking molded thermal insulation develops a purely physical bond between the particles that does not involve any chemical reaction with the silica that would destroy or alter the structure of the siliceous diatoms.

The composition of the new product of this invention is predominantly calcined diatomite, with a minor proportion of finely-divided expanded cellular perlite and a small amount of reinforcing asbestos fiber. This mixture of inorganic mineral materials is of cellular, finely-divided and fibrous character, bonded together with a water-dispersed binder applied by spraying, and compacted by pressure molding into monolithic insulation units. In the final dried product the diatomite, expanded perlite and asbestos fiber will preferably constitute about 77% to 84%, and the binder material will total about 16% to 23% by weight of the composition.

All of the ingredients of the binder solution used to bond the diatomite, expanded perlite and asbestos fiber are completely water dispersible (i.e. colloidally or molecularly soluble) and are compatible within the ranges of proportions disclosed as effective for the purposes of this invention. The mixed composite binder solution thus becomes in effect a single binder having special properties and advantages over any other binder that might be used.

The binder composition includes a major proportion of a high-swelling bentonite clay (about three-fifths), in percent by dry weight of the total solids. A smaller proportion (about two-fifths) is a low- and stable-viscosity modified starch, characterized by having both low and stable viscosity when dispersed in water. Minor ingredients of the binder solution, present as fractional percentages of the total solids and each serving a specific purpose, are: magnesium sulfate, naphthalene sulfonic acid salt, potassium pyroantimoniate, and silicone. The magnesium sulfate is added to prevent gelling of the bentonite clay in the binder dispersion. The naphthalene sulfonic acid salt is a dispersing agent and aids in forming the binder solution and maintaining the mineral and starch particles in uniform suspension. Various other dispersing agents also are suitable for this purpose. The potassium pyroantimoniate may be termed a "starch insolubilizer" as it reacts with the starch in some manner to render the dried film tougher and less soluble, so that it is less susceptible to softening and redispersion in contact with water.

The silicone is included in the binder solution for convenience in application to the mineral insulation mixture to be molded, and it does not function as a binder. The purpose of the silicone is to render the molded diatomite insulation water repellent, and this is best accomplished by applying it as part of the binder solution. This ensures that the silicone is coated on the surfaces of all the finely divided cellular and fibrous particles in the interior of the molded insulation, as well as on the outer surface. An example of a silicone which is suitable in this product is Sodium Methyl Siliconate; but it will be understood by those skilled in the art that other water repellent silicones may be used with equal success.

In preparing the binder solution it has been found advantageous to prepare separately the water dispersions of (a) bentonite clay, (b) modified starch and (c) potassium pyroantimoniate and then combine these dispersions in the proper proportions to make the binder batch, the potassium pyroantimoniate being added last.

The bentonite clay dispersion is prepared by agitating the clay in water in which the specified amounts of magnesium sulfate and dispersing agent have previously been dissolved. The clay and water mixture is allowed to hydrate for several hours to permit swelling of the clay to form a smooth suspension.

The starch suspension is prepared by adding the modified starch to water with agitation, raising the temperature to about 195° F. and holding for about 20 minutes to swell the starch particles. The bentonite clay slurry is then added in the proper proportion and thoroughly mixed until the batch is lump free. The silicone may be added during the period of mixing the clay and starch.

The potassium pyroantimoniate dispersion is prepared by mixing this compound with water, heating to about 210° F. and agitating the mixture to keep the solid material in suspension. The specified quantity of this dispersion is added to the binder batch containing the bentonite clay, starch and silicone just before the binder is to be used for spraying, with the batch temperature maintained between 100° and 130° F.

The diatomite used in making the product of this invention is a finely divided powder and has been precalcined at a temperature above 1800° F. and preferably above 2000° F. This heat treatment eliminates the inherent heat shrinkage of the individual diatomite particles which occurs when they are dehydrated by the high temperatures to which the insulation is subjected in service.

A minor proportion of the diatomite may be included in the composition as the natural, uncalcined mineral and the resulting product will have most of the advantageous properties of this invention. However, in such a case there will be some sacrifice of heat resistance and the product may not perform acceptably at the extreme temperature of 2000° F., due to excessive shrinkage. It will give satisfactory service at somewhat lower temperatures in the range of 1800 to 1900° F., depending upon the proportions of the uncalcined diatomite included in the composition.

The bentonite clay which is the major ingredient of the binder solution is a montmorillonitic clay mineral of the high-swelling type which hydrates and forms a highly expanded viscous suspension in water. Suitable bentonite of this type is commercially available from deposits in Wyoming and several other states. The bentonite clay is the primary binder for the diatomite and perlite particles and enables the bonded monolithic mass to retain its structural integrity and a substantial part of its original strength in service up to the 2000° F. maximum temperature.

The expanded perlite used in the composition is a finely-divided cellular grade of low bulk density, in the range of about 1.8 to 3.5 pounds per cubic foot. Preferably, the expanded cellular perlite has a sieve analysis such that not more than 10 percent by volume is retained on a No. 20 A.S.T.M. Standard testing sieve and with from about 60% to 90% of the material by volume passing a No. 20 A.S.T.M. testing sieve and retained on a No. 50 A.S.T.M. testing sieve. Thus, from about 10% to about 40% by volume of the expanded perlite may pass a No. 50 A.S.T.M. testing sieve.

The expanded cellular perlite serves a special purpose in the composition of the product of this invention. The loose mixture of calcined diatomite and asbestos fiber that has been moistened with a water-dispersed binder presents considerable difficulty in forming a uniform, well-compacted monolithic piece of insulation by compressing in a mold cavity without expulsion of water. It has been discovered that this difficulty can be overcome by including in the mixture a finely-divided, cellular, rigid aggregate material, namely, expanded perlite. Optimum results are obtained with about 10 percent to about 20 percent of perlite by dry weight of the total solids of the composition and some benefit results from as little as 5% of the expanded perlite.

Generally, expanded perlite has been considered unsuitable for use in thermal insulation compositions to be applied on surfaces at temperatures above 1700° F. Surprisingly, in the product of this invention the inclusion of expanded perlite up to 20% by weight of the total composition does not detract from its serviceability in the temperature range from 1700° to 2000° F.

The starch component of the binder solution is a supplementary or "secondary" binder for the diatomite, expanded perlite and asbestos fiber of the composition. The starch ingredient of the composite binder solution serves a very important purpose in enabling the moistened mixture of finely-divided and fibrous minerals to be molded by compaction into a monolithic insulation unit of adequate strength for handling in manufacture, shipment and installation. Due to its organic nature, the starch binder does not persist as such at high service temperatures; however, it is not essential that it should do so, as in the high temperature range the bentonite clay serves as a mineral, heat-resistant bond to maintain the structure, hardness and strength of the insulation.

For the purposes of this invention the starch ingredient used in the binder solution is defined as a low- and stable-viscosity modified starch. By this terminology is meant that the starch has been modified so that its solution in water has a low viscosity compared with that of ordinary starch and preferably that the low viscosity is substantially stable over a period of time. The viscosity of starch may be reduced by various chemical treatments, including acid, heat, chlorination (oxidation), or by enzymatic action. Certain starch acetate esters, commonly termed "acetylated starch" have both low viscosity and exceptional stability in water solution, and on drying the solution this modified starch forms a strong, tough, flexible film which is an excellent binder for fine mineral particles. A commercial variety of acetylated corn starch, produced by National Starch and Chemical Corporation under the brand name "Kofilm," has been found to give very satisfactory results as the starch ingredient of the binder solution. Another commercial brand of acetylated starch which gives excellent results is "Mira-Film 90 Acetate Gum" produced by the A. E. Staley Company.

The "Kofilm" brand of acetylated starch is modified starch produced by directly linking acetyl groups to starch molecules. The extent of esterification is quite limited, generally in the range of about 2% to 5% of derivatized hydroxyl groups per glucose unit of the starch. The acetylation reduces the viscosity of the water-dispersed starch, compared with the untreated parent starch, and the viscosity is extremely stable. Other properties of the parent corn starch are also improved, such as hydrating ability, tensile strength, temperature stability and resistance to mechanical breakdown of the dispersed starch paste.

Modified starches are well known and various modified starches suitable for use in the binder composition of the invention are produced commercially by several starch manufacturers. The book "Chemistry and Industry of Starch," Second Edition (1950), by Ralph W. Kerr (Academic Press, New York, N.Y.), in the chapter on "Manufacture of Modified Corn Starches," describes numerous treatments and processes to modify such properties of starch as strength, color, mobility, viscosity and swelling in water.

Quoting from the above chapter:

"Within recent years there has been a growing interest in modifying the paste properties of starch by a very limited amount of chemical derivatization. These are in reality partial derivatives such as esters and ethers. However, the degree of substitution is so low—much less than an average of one derivatized hydroxyl group per glucose residue—that the products behave in many respects like native starches, particularly in that the granules are insoluble and gelatinize when heated in water to form a paste. The pastes of some of these products differ materially from that of the parent starch."

Quoting further:

"Considering that in many cases these starch products do not show on analysis more than one substituted group for each twenty or more glucose units in starch, it seems rather remarkable that the colloidal characteristics of the modified starch should have changed fundamentally. It would appear that a very small number of substitutions on a starch chain, particularly of the linear amylose molecules, are sufficient to prevent the orientation of these molecules to the extent required for associative bonds to form as they do in retrogradation, set back in pastes and the formation of gels."

From the above discussion and quotations regarding chemical modification of starches it is apparent that the partially esterified acetylated corn starch esters of the "Kofilm" type is particularly well adapted to provide the low- and stable-viscosity starch paste requisite for the composite binder of this invention and thus is the preferred type of modified starch.

In the claims, the phrase "water-dispersible, low- and stable-viscosity, modified starch" will be understood to refer to modified or converted starch, the modification (whether by esterification, acetylation, or other reaction) being on the order of 5% or less, to produce water dispersibility, and a low- and stable-viscosity.

The asbestos fiber used in the new molded diatomite block insulation is of the type, generally referred to as a "reinforcing grade," such as is commonly used in the manufacture of molded thermal insulations. Crysotile fibers in the 3 and 4 groups of the Canadian (Quebec Asbestos Manufacturers' Assn.) fiber classifiaction system are suitable. Also, crocidolite (blue) and Amosite asbestos fibers from South Africa are very effective and may be used if of proper length, generally in the range from ¼ inch to ¾ inch length. The asbestos fiber adds toughness to the molded insulation and, particularly, provides a mechanical reinforcement that tends to prevent the breaking apart of a piece that has become cracked or otherwise damaged in handling. In some cases it may be desirable to produce the new diatomite insulation as units of relatively small dimensions for special conditions of installation, and where this is the situation the asbestos fiber may be omitted from the composition.

The following is a typical example of the practice of this invention, illustrating a suitable composition and method of manufacture and the properties of the resultant new precise-dimension molded diatomite insulation.

|  | Percent solids dry weight basis |
|---|---|
| Diatomite powder, calcined above 2000° F. | 56.80 |
| Expanded perlite, finely-divided | 15.75 |
| Asbestos fiber, reinforcing | 6.30 |
| Bentonite clay (montmorillonitic) | 11.81 |
| Modified starch (low- and stable-viscosity, acetylated) | 7.41 |
| Magnesium sulphate | 0.70 |
| Potassium pyroantimoniate | 0.44 |
| Naphthalene sulfonic acid salt, dispersing agent | 0.44 |
| Silicone, water repellent (sodium methyl siliconate) | 0.35 |
|  | 100.00 |

In the manufacturing process the expanded perlite, calcined diatomite and asbestos fiber of the above formula were weighed and thoroughly blended as a dry mixture. This dry mixture was then sprayed with a measured quantity of the binder solution, containing the specified amounts of bentonite, dispersing agent, modified starch, magnesium sulfate, potassium pyroantimoniate, and silicone. This moistened mixture of mineral materials and binder was then further agitated and blended to complete the distribution of the binder solution over the surfaces of all of the mineral particles and fibers. The completed mixture was a bulky, loose, granular mass that appeared to be slightly damp, but not visibly wet, and had a wet bulk density of about 16 pounds per cubic foot.

A predetermined weighed quantity of the above-described damp mixture was placed in a mold cavity having the desired dimensions of the molded insulation piece to be produced and then subjected to light molding pressure in the range of about 70 to 120 pounds per square inch, to compact the loose material into a solid monolithic molded piece having the exact configuration and dimensions of the molded cavity, but without expelling any water from the mold. The molded piece was then removed from the mold cavity, subjected to drying at a temperature of about 250° F., for removal of the water, and tested. The dried molded product was a monolithic, hard, strong piece of thermal insulation which exhibited negligible drying shrinkage so that the finished piece had the exact dimensions of the mold in which it was formed and thus required no machining or other finishing treatment before use. The residual moisture content of the dried insulation was less than 5 percent by weight of the total solid content.

The water content of the molded piece of the above-described composition, before drying, was about 1.0 times the weight of the dry solids. With variations in the composition, however, the water ratio may vary from about 0.9 to 1.2 times the weight of dry solids.

When the thermal insulation product of the above typical example was tested it exhibited the following properties:

| | |
|---|---|
| Density, lb. per cubic foot | 23.4 |
| Flexural strength (transverse modulus), dry, lb. per sq. in. | 120 |
| Flexural strength, after 24 hour exposure to high humidity, 95% R.H., p.s.i. | 65 |
| Water absorption, after 24 hr. immersion, percent by weight | 20.0 |
| Water absorption, after 3 hr. boiling water immersion, percent by weight | 52.9 |
| Linear shrinkage, after 24 hr. exposure to soaking heat at 2000° F., percent | 2.9 |
| Compressive strength, at 10% deformation, lb. per sq. in. | 209 |
| Resistance to abrasion, A.S.T.M. C421–61, percent weight loss | |
| After 10 minutes test | 30 |
| After 20 minutes test | 55 |

Thermal conductivity measurements of the product of the above typical example gave the following values, in B.t.u. per hour per square foot per degree F. per inch of thinckness:

| | |
|---|---|
| Conductivity at 500° F. mean temperature | 0.70 |
| 750° F. | 0.76 |
| 1000° F. | 0.84 |

From the above test results it is evident that the new diatomite thermal insulation of this invention is a product possessing an extraordinary combination of properties: it has relatively low density, high flexural and compressive strengths, retains substantial strength under high humidity exposure, has low water absorption, low shrinkage with no cracking at temperatures up to 2000° F., substantial toughness as measured by resistance to abrasion, and low thermal conductivity at high temperatures. The new product meets, with an adequate margin, every requirement of Specification MIL–I–2819 D, Class 4, covering thermal insulation for continuous service on surfaces at a temperature of 2000° F.

In the practice of this invention some variation in the proportions of each of the components in the composition illustrated in the above typical example is permissible. For optimum properties of the finished product and greatest ease of manufacture, compositions within the following ranges are preferred:

| | Perferred Composition Range, Dry Weight Percent | |
|---|---|---|
| | Min. | Max. |
| Diatomite powder, calcined above 2,000° F. | 55 | 65 |
| Expanded cellular Perlite, finely-divided | 10 | 20 |
| Asbestos Fiber, reinforcing grade | 5 | 8 |
| Bentonite Clay (montmorillonitic) | 10 | 15 |
| Modified Starch (low- and stable-viscosity) | 6 | 8 |
| Magnesium Sulfate | 0.6 | 0.8 |
| Potassium Pyroantimoniate | 0.3 | 0.5 |
| Naphthalene Sulfonic Acid Salt (dispersant) | 0.3 | 0.5 |
| Silicone, water repellent (Sodium Methyl Siliconate) | 0.3 | 0.4 |

It is of course to be understood that, within the above percent ranges, if one ingredient such as the diatomite or expanded perlite is at the minimum or maximum of the range, then the percentages of the other ingredients will be adjusted accordingly to total 100 percent.

Referring to the above-stated preferred ranges of composition, it is evident that the organic material (starch, dispersant and silicone) in the finished molded diatomite insulation will range from about 6.6 to 8.9 percent of its dry weight. The remainder, about 91.1 to 93.4% by dry weight, is mineral and inorganic material.

Most, though not all, of the advantages of this invention are afforded by compositions within a somewhat broader range, as follows:

|  | Broad Composition Range, Dry Weight Percent | |
| --- | --- | --- |
|  | Min. | Max. |
| Diatomite powder, pre-calcined | 50 | 75 |
| Expanded Perlite, finely-divided | 5 | 25 |
| Asbestos Fiber, reinforcing grade | 0 | 10 |
| Bentonite Clay (montmorillonitic) | 8 | 20 |
| Modified Starch, low- and stable-viscosity | 5 | 10 |
| Magnesium Sulfate | 0 | 1.0 |
| Potassium Pyroantimoniate | 0.2 | 0.6 |
| Naphthalene Sulfonic Acid Salt (dispersant) | 0 | 0.6 |
| Silicone, water repellent (Sodium Methyl Siliconate) | 0.2 | 0.6 |

If, for example, the diatomite content is reduced to about 50% and the expanded perlite increased to about 25% by weight, a precision-molded insulation block can be made having properties generally equal to those of the above typical example of this invention as to density, strength, moisture resistance and thermal insulation efficiency. However, due to the lower heat resistance of expanded perlite, compared with calcined diatomite, this product will not be suitable for continuous service at 2000° F. and its temperature limit may be about 1900° F.

As indicated above, the magnesium sulfate and the dispersing agent added to the bentonite slurry, to aid in producing a uniform well dispersed suspension of the clay and to control its viscosity, may be omitted. However, if this is done the manufacturing operation, particularly the spraying of the binder, becomes more difficult to control and the product tends to be less uniform in properties. Similarly, omission of the silicone affects only the resistance to water absorption, so that if moisture resistance is not required, the silicone ingredient may be omitted.

The preferred range of density of the molded diatomite insulation of this invention is from about 22 to 26 pounds per cubic foot. More broadly, the product can be made in the range from about 20 to 30 pounds per cubic foot. At densities below 22 pounds there is some sacrifice of strength and abrasion resistance, while at densities above 26 pounds the thermal insulating efficiency is somewhat reduced.

The new diatomite insulation of this invention has the great advantage that it can readily be produced in pieces of large size, up to 12" by 36", width and length, and up to 6" thickness. Yet a piece of the new insulation of this maximum size weighs only about 35 pounds and can easily be handled by a workman for installation on the job. The large size of the insulation units also greatly reduces the number and length of joint spaces in the installed insulation through which heat losses from the hot surface can occur. Thus the linear joint space of installed 12" x 36" insulation units is about one-fifth that of an installation of 9" x 4.5" x 2½" insulation brick, laid flatwise, on a like area of surface being insulated. Further, since the number of units to be handled by the workman is greatly reduced, the labor cost of installation of the larger unit is considerably less than for conventional insulating brick.

The new diatomite insulation in block form is particularly suitable for installation on equipment with heated surfaces in the 1500° F. to 2000° F. range. This includes boiler furnaces, ceramic kilns, heat treating and industrial furnaces, reheaters, hot blast stoves, breechings, petroleum cracking towers, chemical process equipment, and as refractory wall backing for boilers and furnaces of all types.

It will be understood that a considerable variety of products may be made within the ranges disclosed herein and it is therefore intended that this invention shall be limited only as set forth in the following claims.

The embodiments of the invention in which an exclusive property or privilege is claimed are defined as follows:

1. A molded thermal insulating material, comprising at least about 50 percent of pre-calcined diatomite powder, with a minor proportion of not more than about 25 percent of finely-divided expanded perlite and up to about 10 percent by weight of reinforcing asbestos fiber, from about 8 percent to about 20 percent by weight of a dispersed montmorillonitic clay constituting a primary binder, from about 5 percent to about 10 percent by weight of a low- and stable-viscosity modified starch constituting a secondary binder, from about 0.2 percent to about 0.6 percent by weight of potassium pyroantimoniate, and from about 0.2 percent to about 0.6 percent by weight of sodium methyl siliconate, said composition being bonded into a monolithic molded mass, said molded thermal insulating material showing no significant change from mold dimensions, having high flexural and compressive strengths, having high thermal insulating efficiency in the range from 1500° to 2000° F., being highly resistant to structural disintegration by moisture or boiling water, and being capable of maintaining its structural integrity in continuous service on surfaces at temperatures up to 2000° F.

2. A thermal insulating material according to claim 1, wherein said low- and stable-viscosity modified starch constituting a secondary binder is an acetylated corn starch.

3. A thermal insulating material according to claim 1, wherein said finely-divided expanded perlite has a bulk density in the range of 1.8 to 3.5 pounds per cubic foot and has a particle size such that from 60 to 90 percent by volume will pass through a number 20 and be retained on a number 50 A.S.T.M. testing sieve by sieve analysis.

4. A molded thermal insulating material comprising from about 50 percent to about 75 percent by weight of precalcined diatomite powder, from about 5 percent to about 25 percent of finely-divided expanded perlite, from about 8 percent to about 20 percent of a dispersed montmorillonitic clay constituting a primary binder, from about 5 percent to about 10 percent of a low- and stable-viscosity modified starch constituting a secondary binder, from about 0.2 percent to about 0.6 percent of potassium pyroantimoniate, from about 0.2 percent to about 0.6 percent of sodium methyl siliconate, and up to about 10 percent reinforcing asbestos fiber, said composition being bonded into a monolithic molded mass, said molded thermal insulating material showing no significant change from mold dimensions, having high flexural and compressive strengths, having high thermal insulating efficiency in the range from 1500° to 2000° F., being highly resistant to structural disintegration by moisture or boiling water, and being capable of maintaining its structural integrity in continuous service on surfaces at temperatures up to 2000° F.

5. A thermal insulating material according to claim 4, wherein said low- and stable-viscosity modified starch constituting a secondary binder is an acetylated corn starch.

6. A thermal insulating material according to claim 4, wherein said finely-divided expanded perlite has a bulk density in the range of 1.8 to 3.5 pounds per cubic foot and has a particle size such that from 60 to 90 percent by volume will pass through a number 20 and be retained on a number 50 A.S.T.M. testing sieve by sieve analysis.

7. A molded thermal insulating material comprising from about 55 percent to about 65 percent by weight of 2000° F. precalcined diatomite powder, from about 10 percent to about 20 percent of finely-divided, cellular expanded perlite, from about 5 percent to about 8 percent of reinforcing asbestos fiber, from about 10 percent to about 15 percent of a dispersed montmorillonitic clay constituting a primary binder, from about 6 percent to about 8 percent of a low- and stable-viscosity modified starch constituting a secondary binder, from about 0.6 percent to about 0.8 percent of magnesium sulfate as a viscosity stabilizer for said dispersed montmorillonitic clay, from about 0.3 percent to about 0.5 percent of potassium pyroantimoniate as an insolubilizer for said modified starch, from about 0.3 percent to about 0.5 percent of naphthalene sulfonic acid salt as a dispersant for said montmorillonitic clay, and from about 0.3 percent to about 0.4 percent of sodium methyl siliconate as a water repellent, said molded thermal insulating material showing no significant change from mold dimensions, having high flexural and compressive strengths, having high thermal insulating efficiency in the range from 1500° to 2000° F., being highly resistant to structural distintegration by moisture or boiling water, being highly resistant to mechanical stresses involving abrasion, and being capable of continuous service on surfaces at temperatures up to 2000° F. without appreciable shrinkage or cracking of said insulation.

8. A thermal insulating material according to claim 7, wherein said low- and stable-viscosity modified starch constituting a secondary binder is an acetylated corn starch.

9. A thermal insulating material according to claim 7, wherein said expanded cellular perlite has a bulk density in the range of 1.8 to 3.5 pounds per cubic foot and has from 60 to 90 percent by volume passing a No. 20 and retained on a No. 50 A.S.T.M. testing sieve, by sieve analysis.

10. A molded thermal insulating material composed of about 56.8 percent by dry weight of 2000° F. precalcined diatomite powder, about 15.75 percent of finely-divided expanded cellular perlite, about 11.81 percent of a high-swelling montmorillonitic clay, about 7.41 percent of a low- and stable-viscosity modified starch, about 6.3 percent of a reinforcing grade of abestos fiber, about 0.7 percent of magnesium sulfate, about 0.44 percent of potassium pyroantimoniate, about 0.44 percent of a naphthalene sulfonic acid salt as a dispersing agent, and about 0.35 percent of sodium methyl siliconate, said composition being bonded into a monolithic molded mass, said molded thermal insulating material showing no significant change from mold dimensions, having a density in the range of 22 to 26 pounds per cubic foot, having high thermal insulating efficiency in the range from 1500° to 2000° F., having high flexural and compressive strengths, being highly resistant to mechanical stresses involving abrasion, being highly resistant to structure distintegration by moisture or boiling water, and being capable of continuous service on surfaces at temperatures up to 2000° F. without appreciable shrinkage or cracking of said insulation.

11. In a process for preparing a water dispersed binder solution for spray application to a dry mixture of thermal insulation materials comprising calcined diatomite powder, finely-divided expanded perlite and asbestos fiber, to be bonded by compaction molding into a monolithic insulation unit, said water dispersed binder consisting of a major proportion of about three-fifths of a montmorillonitic clay and a minor proportion of about two-fifths of a low- and stable-viscosity modified starch dispersed in water, with lesser proportions, representing fractional percentages of the total solids, of potassium pyroantimoniate and sodium methyl siliconate also dispersed therein, the steps of preparing separately a water dispersion of the montmorillonitic clay including small amounts of a dispersing agent and magnesium sulfate, preparing separately a water dispersion of the modified starch, adding the dispersion of the clay to the starch dispersion and mixing them to produce a uniform, lump-free dispersion, adding and mixing into the dispersion a small amount of sodium methyl siliconate, preparing separately a water dispersion of potassium pyronatimoniate and adding a small quantity of this to the previously mixed starch-clay dispersion just prior to using the water dispersed binder for spraying.

12. The process according to claim 11, including the step of permitting the water dispersion of montmorillonitic clay to hydrate for several hours to permit swelling of the clay to form a smooth suspension.

13. The process of claim 11, including the step of raising the temperature of the water dispersion of the modified starch to about 195° F. and holding for about twenty minutes to swell the starch particles.

14. The process of claim 11, including the step of heating the potassium pyroantimoniate dispersion to about 210° F. and agitating the mixture to keep the solid material in suspension.

15. In a process for preparing a water dispersed binder solution for spray application to a dry mixture of thermal insulation materials comprising calcined diatomite powder, finely-divided expanded perlite and asbestos fiber, to be bonded by compaction molding into a monolithic insulation unit, said water dispersed binder consisting of a major proportion of about three-fifths of montmorillonitic clay and a minor proportion of about two-fifths of a low- and stable-viscosity modified starch dispersed in water, with lesser proportions, representing fractional percentages of the total solids, of potassium pyroantimoniate and sodium methyl siliconate also dispersed therein, the steps of preparing separately a water dispersion of the montmorillonitic clay including small amounts of a dispersing agent and magnesium sulfate, permitting said dispersion to hydrate for several hours so as to produce swelling of the clay to form a smooth suspension, preparing separately a water dispersion of the modified starch, raising the temperature of the modified starch suspension to about 195° F. and holding it at said temperature for about twenty minutes to swell the starch particles, adding the dispersion of the clay to the starch dispersion and mixing them to produce a uniform, lump-free dispersion, adding and mixing into the dispersion a small amount of sodium methyl siliconate, preparing separately a water dispersion of potassium pyronantimoniate and heating said last named dispersion to about 210° F. and agitating it to keep the solid material in suspension, and adding a small quantity of said last named suspension to the previously mixed starch-clay dispersion just prior to using the water dispersed binder for spraying.

References Cited
UNITED STATES PATENTS 2,884,380  4/1959  Cook et al. _____ 106—214

TOBIAS E. LEVOW, *Primary Examiner.*

JAMES E. POER, *Examiner.*